J. CONLEY.
LATRINE INCINERATOR.
APPLICATION FILED NOV. 2, 1907.
905,501.
Patented Dec. 1, 1908.
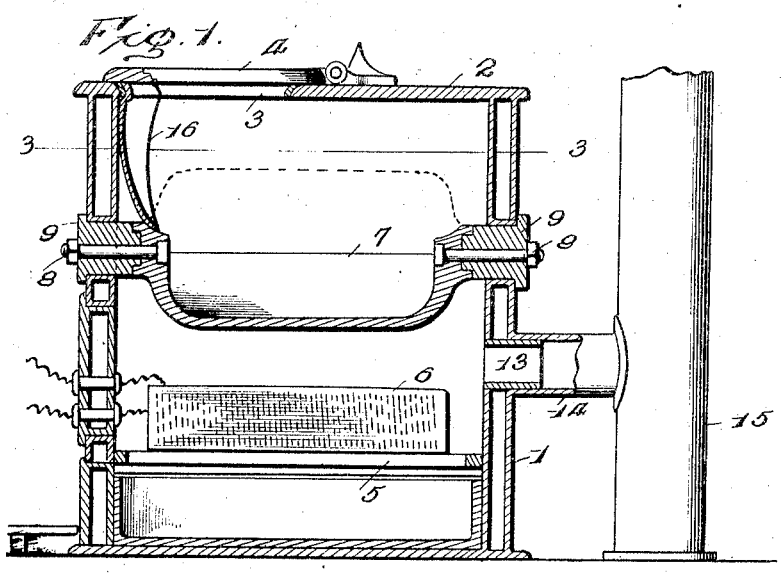
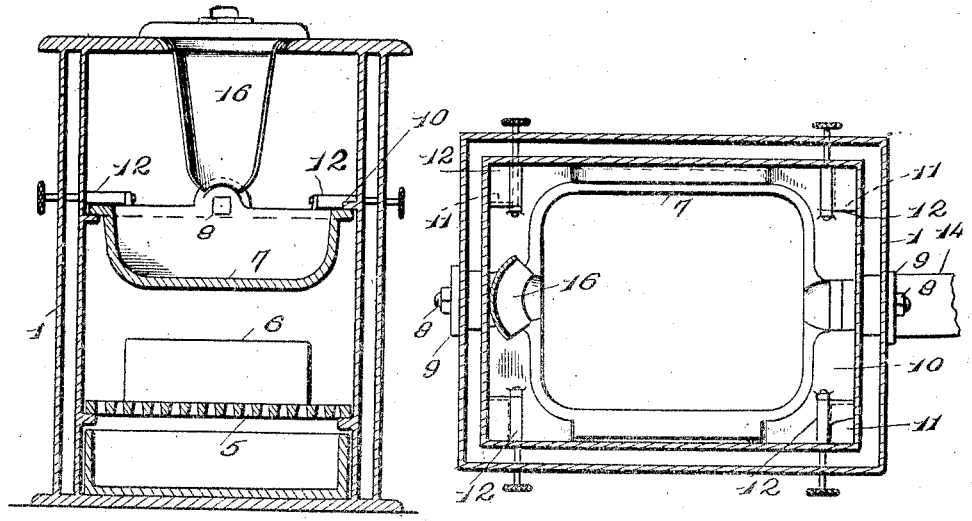
Witnesses
Inventor
Joseph Conley
By Dudley, Browne & Phelps.
Attorneys

UNITED STATES PATENT OFFICE.

JOSEPH CONLEY, OF ANADARKO, OKLAHOMA.

LATRINE-INCINERATOR.

No. 905,501.　　　Specification of Letters Patent.　　　Patented Dec. 1, 1908.

Application filed November 2, 1907. Serial No. 400,424.

*To all whom it may concern:*

Be it known that I, JOSEPH CONLEY, citizen of the United States, residing at Anadarko, in the county of Caddo, Oklahoma, have invented certain new and useful Improvements in Latrine - Incinerators, of which the following is a specification.

My invention relates to certain new and useful improvements in latrine incinerators and the object of my invention is to provide a device of this character which will be cheap and simple in construction and particularly adapted for domestic use.

With these objects in view my invention consists in certain constructions, combinations and arrangements of parts the preferred form of which will be first described in connection with the accompanying drawings and then the invention particularly pointed out in the appended claims.

Referring to the drawings wherein the same part is designated by the same reference numeral wherever it occurs, Figure 1 is a central longitudinal section of the preferred form of my invention; Fig. 2 is a central transverse section and Fig. 3 is a section taken on line 3—3 of Fig. 1.

1 designates a box or casing preferably formed of sheet metal and preferably rectangular in form.

2 designates the top of the casing having the opening 3 forming the latrine seat, and 4 is the cover therefor.

5 is a grate adapted to support an electric, or other form of heater 6, by means of which the incinerating operation is effected. It is of course obvious that a fire may be built on the grates if desired and the use of the heater obviated.

7 designates a pan which has secured to its ends by means of the bolts 8, the trunnions 9 which are journaled in the sides of the casing.

10 is a plate secured to the sides of the casing in the plane of the top of the pan 7. This plate is provided with an opening that corresponds in shape to the outline of the top of the pan so that the pan can be turned up into the position shown in dotted lines in Fig. 1. In the corners of the plate 10 I provide openings 11 provided with dampers 12.

13 is an opening in the side of the casing 1 connected by a pipe 14 to a stack 15, whereby the gases and products of combustion may be carried away.

16 is a trough secured to the under side of the cover 2 adjacent to the front of the opening 3. This trough extends down from under the seat and carries liquid into the pan and prevents it from coming into contact with the journal of the pan.

In the operation of my device the dampers 12 are normally closed and when there is a sufficient accumulation in the pan 7 the heating means is placed on the grate 5 and the dampers 12 opened, as the lid 4 is closed at this time the gases and vapors driven off from the material in the pan must pass through the openings 11 and over the head supply on the grates 5 on their way to the stack 15. This deodorizes and thoroughly disinfects the gases and vapors. When all the moisture in the pan has been driven off and the solid material evaporated to dryness the heating medium, if an electric heater or the like is used, may now be withdrawn and the dry material dumped on the grate for removal by tipping over the pan to the position indicated by dotted lines in Fig. 1. If however a fire has been used the dry material is dumped on the fire and thereby consumed, the fire acting while the pan is inverted to thoroughly burn out and cleanse the interior of the pan.

While I have described what I believe to be the preferred form of my invention I desire to have it understood that many changes may be made in the form, construction and arrangement of parts without departing from the spirit of my invention. For instance a deodorizing chamber can be connected to the casing and the stack, so that normally the gases given off will pass through this chamber and out the stack, the chamber being provided with suitable dampers to cut it off when heat is applied.

What I claim as new and desire to secure by Letters Patent is

1. In a latrine incinerator the combination with a casing having a seat opening through the top thereof, a pan pivoted in opposite sides of the casing and extending beneath the seat, a trough extending from the front of the seat-opening over the journal and into the pan, a grate located beneath the pan and a stack communicating with the casing between the grate and the pan.

2. In a latrine incinerator the combination with a casing, having a seat opening through the top thereof, a pan pivoted in opposite sides of the casing and extending beneath the seat, a plate provided with a central opening surrounding the pan, the plate being secured at its edges to the sides of the casing, said plate being provided with openings therethrough, a trough extending from the front of the seat-opening over the journal and into the pan, a grate located beneath the pan, and a stack communicating with the casing between the grate and plate.

3. In a latrine incinerator the combination with a casing having a seat opening through the top thereof, a pan pivoted in opposite sides of the casing and extending beneath the seat, a plate provided with a central opening surrounding the pan, the plate being secured at its edges to the sides of the casing, said plate being provided with openings therethrough, dampers for said last mentioned openings, a trough extending from the front of the seat-opening over the journal and into the pan, a grate located beneath the pan, and a stack communicating with the casing between the grate and plate.

In testimony whereof I affix my signature in presence of two witnesses.

JOSEPH CONLEY.

Witnesses:
FRANCIS M. PHELPS,
K. E. KLEIN.